United States Patent

[11] 3,619,262

| [72] | Inventor | Marnell A. Segura<br>Baton Rouge, La. |
|---|---|---|
| [21] | Appl. No. | 3,497 |
| [22] | Filed | Jan. 16, 1970 |
| [45] | Patented | Nov. 9, 1971 |
| [73] | Assignee | Esso Research and Engineering Company |

[54] PROCESS FOR DEPOSITING CARBON ON IRON
11 Claims, No Drawings

[52] U.S. Cl............................................... 117/100 M,
75/212, 117/46 CB, 117/127, 117/169
[51] Int. Cl.............................................. C23f 9/02,
B44d 1/12
[50] Field of Search........................................ 117/16, 27,
31, 46 CB, 100 M, 127, 169, 226; 75/2, 212;
148/6.14

[56] References Cited
UNITED STATES PATENTS

| 2,697,028 | 12/1954 | Baker et al.................. | 117/46 CB |
| 2,775,516 | 12/1956 | Shafer......................... | 117/169 R |
| 3,167,428 | 1/1965 | Globus........................ | 75/212 |
| 3,202,537 | 8/1965 | Norman et al................ | 117/100 M |
| 3,322,536 | 5/1967 | Stoddard et al............... | 75/212 |
| 3,407,089 | 10/1968 | Sampson et al............... | 117/100 M |
| 3,511,718 | 5/1970 | Segura......................... | 117/100 M |

*Primary Examiner*—William D. Martin
*Assistant Examiner*—Raymond M. Speer
*Attorney*—Manahan and Wright ABSTRACT: A process for coating a metal surface, such as a reduced iron ore, with an adherent layer of carbon is provided. The metal is contacted with carbon and a mixture of olefins. Suitably, the olefin mixture contains polyenes and dienes, preferably cyclopolyenes and cyclodienes. The process is conducted at temperatures ranging from about 200° F. to about 600° F. The metal surface, coke, and the olefinic mixture is brought into contact by any solid-liquid contact means, e.g., by spraying a slurry of carbon and olefin mixture in a fluidized bed of the metal or by slurrying the reactants in a solid blender. The concentration of reactants, the bath temperature and the contact time generally will control the amount of carbon that is deposited on the metal surface.

PROCESS FOR DEPOSITING CARBON ON IRON

BACKGROUND OF THE INVENTION

There are a number of techniques known to the art for producing metal powders and aggregates of metal powders, particularly ferrous metal powders. For example, it is known to produce iron containing materials by the direct reduction of iron ores.

In direct reduction processes, iron ores or iron oxides often are reduced by interaction of the ore with solid carbonaceous reducing agents such as coal, coke or charcoal; or, the ore is reduced by interaction with various gaseous reducing agents, such as carbon monoxide and/or hydrogen.

In processes using solid reductants, crushed ore and carbonaceous reductant material is added in a rotary kiln, for example. The solids pass through the kiln at elevated temperatures at which reduction of the ore takes place. The product which is discharged from the kiln, is crushed and the reduced iron material is magnetically separated from the slag constituents present. Because the reduced crushed iron material is relatively fine, generally, the product is briquetted before use.

In processes where iron ore or iron oxides are reduced by gaseous reducing agents, the metal containing material is passed through a rotary kiln or down the shaft of a furnace while in contact with a gaseous reducing agent. In more advanced processes, the solid iron bearing material is fluidized in a stream of hot reducing gases and thereby reduced to a metallic iron bearing material.

Processes for reducing iron ores with gaseous reducing agents are particularly adaptable to handling fine iron bearing materials and the products of such processes are generally characterized as having relatively high surface areas.

The acute tendency of reduced metals, such as the iron powder, prepared in the above processes to chemically react and back-oxidize is a problem of great consequence to the potential user of such materials. Even when the metal is compacted at relatively high temperatures and pressures, the tendency to back-oxidize still remains since the briquettes formed also are characterized by high surface areas. Additionally, the briquettes have high porosities and large internal voids. Consequently, exposure of the briquettes to moisture and/or air, can result in back-oxidation of the metal bearing material. Economic utilization of these reduced materials dictates that back-oxidation be substantially avoided.

Numerous techniques have been proposed to passivate these reactive metal powders. For example, it has been suggested to protect reduced metallic iron from back-oxidation by incorporating or bonding to the metal surface, a layer or coating of solid carbon. By providing a carbon protective layer, the carbon can serve also as a reducing agent for any residual oxides present in the ore.

The carbon can be incorporated as a protective layer and reducing agent by pelletizing a mixture of carbon or carbonaceous material and the reduced metal. Unfortunately, pelletized mixtures of carbon and metal generally do not retain their integrity on handling. Consequently, there is a considerable loss of fine carbon powder and the desired protection against back-oxidation is not achieved.

Also, it has been proposed to protect reduced metal powders from back oxidation by cracking a hydrocarbon on the surface of the reduced iron thereby forming a bonded protective covering of carbon on the metal surface. However, thermal cracking as a means to deposit a protective layer of carbon on a metal surface presents an additional economic burden in the processing and handling of such materials. Control of the amount of carbon deposited is more difficult to achieve, also.

SUMMARY OF THE INVENTION

According to this invention there is provided a method for depositing an adherent layer of carbon on metal surface, thereby protecting the metal against back-oxidation. The carbon is deposited on the metal surface by bringing the metal and carbon in contact with each other at about 200° F. to about 600° F. in the presence of an olefin mixture containing polyenes and dienes.

In one embodiment of the invention, the coke is deposited on the metal surface by fluidizing the coke and metal in a fluidized bed reactor and introducing into the fluidized mixture, an olefinic material containing polyenes and dienes.

Optionally, the coke can be deposited on the metal surface by heating a mixture of reduced iron ore and coke from about 200° F. to about 600° F. in the presence of an olefin mixture containing polyenes and dienes in an amount ranging from about 0.1 wt. percent to about 5 wt. percent based on the total weight of ore, coke and olefins.

The olefinic mixture utilized in practicing this invention preferably contains cyclopolyenes and cyclodienes. The composition of the olefinic mixture is set out in greater detail below.

DETAILED DESCRIPTION OF THE INVENTION

Although the techniques described herein are applicable for producing coatings of carbon on metal powders, the techniques are particularly applicable to providing coatings of carbon on ferrous metals, and more particularly in reduced iron ores.

The reduced ferrous metal generally will be the product of a direct reduction process. Preferably the reduced metal will be the product of a fluidized iron ore reduction process.

The reduced iron ore typically will be in the form of finely divided particulate solids. The finely divided reduced metal solids will have particles essentially within 1 to 10,000 microns in size and the average particle size will range generally from about 40 to about 500 in microns in size.

Generally, the product will range from about 80 to about 95 percent metallization. The percent metallization refers to the percent of the total iron in the reduced ore product which is present as elemental iron.

A typical reduced iron material can be obtained, for example, by charging a crushed hematite ore, or ferric oxide, to a first fluidized bed or beds and reducing the ore therein with, for example, hydrogen and/or carbon monoxide to form an iron oxide of a lower oxidation state.

Normally the ore is passed downwardly through the reactor to subsequent bed or beds while the reducing gases, at temperatures of about 1200° F. to about 1900° F., ascends, fluidizing the solids while reducing the oxides.

The reducing gas is introduced into the reactor at pressures generally ranging from about atmospheric to about 150 p.s.i.g.

In the subsequent bed or beds, the partially reduced iron oxide is further reduced, for example, to ferrous oxide by contact with the hot reducing gases. Finally, the ferrous oxide is reduced in another bed or beds to provide the reduced iron ore ranging from about 80 to about 95 percent metallization The reduced metal iron ore is mixed with a carbonaceous material such as coal, carbon black, e.g. petroleum coke, furnace black, charcoal black, and the like. Preferably, the reduced iron ore material is mixed with petroleum coke. Petroleum coke is the preferred carbon-containing material since it is relatively inexpensive. Its use yields a suitable carbon coated product. The particle size of the coke or carbonaceous material employed in coating the metal generally will range from about 10 to about 200 microns and preferably from about 10 to about 44 microns.

The ratio of carbon added to the amount of reduced iron product used is adjusted according to the desired end product. Carbon coated reduced iron ore prepared according to this process contains generally from about 1 wt. percent to about 20 wt. percent carbon based on the total weight of the product; preferably such products contain from about 1 wt. percent to about 5 wt. percent carbon.

The coke and reduced iron ore can be mixed in an apparatus generally employed for mixing solid materials; for example, the coke and reduced ore can be mixed in a solids blender, rotary kiln, and the like. Optionally, the coke and reduced iron ore material can be introduced into a fluidization reactor and the solids can be fluidized in a reducing gas stream or in the stream of an inert gas such as nitrogen. Fluidizing gases which are oxidizing toward the metal are avoided.

Next, the coke and the reduced iron ore material are heated to temperatures from about 200° F. to about 600° F; preferably, the mixture is heated to a temperature from about 200° F. to about 400° F.

When the reactants are mixed in a fluidized reactor the solid materials can be heated for example by employing a hot fluidizing gas stream. When the materials are reacted in a solids blender, the solids may be preheated, for example, by hot fluidizing gases. Alternatively, the solids may be heated in a blender which is equipped with appropriate external heating means. For example, the solids blender can be provided with a steam jacket for supplying heat to the solid materials in the blender.

Heating of the solids material is continued until they reach a temperature of at least 150° F.; preferably they should be heated until the solid materials reach a temperature in the range of about 200 F. to about 400° F.

After the solid mixture has reached the desired temperature, an olefinic hydrocarbon is introduced to the mixture of coke and reduced iron.

The liquid olefin hydrocarbon comprises acyclic and cyclic olefins, diolefins, triolefins, especially dimers, trimers and tetramers of such olefins. Especially suitable are olefin mixtures of such compounds which contain dimers, trimers and tetramers of cyclopolyenes and cyclodienes. For best results, the mixture should contain from about 2 percent to about 15 percent, and preferably from about 5 percent to about 10 percent polyenes or dienes, or both, based on the total weight of olefins in the mixture. Preferably, the dienes are cyclodienes. Suitable mixtures can be formed by mixing commercial products and residuals. For example, suitable olefinic liquid hydrocarbon mixtures can be obtained by mixing polyenes and dienes or both with commercially available olefinic liquid hydrocarbons such as obtained by steam cracking naphthas to obtain olefinic mixtures which have been partially polymerized over hot clay. The source of such polyenes to dienes itself can also be a commercial mixture. The resultant olefinic mixture employed consists generally of olefins, diolefins, polyolefins, dimers, trimers, tetramers and the like of average carbon number ranging from about $C_{20}$ to about $C_{60}$, more particularly, from about $C_{30}$ to about $C_{45}$.

The viscosity of liquid olefin hydrocarbon preferably ranges from about 100 SSU (ASTM D-8-53) to about 250 SSU, and preferably from about 150 SSU to about 230 SSU, and can be readily controlled, if desired, by incorporation of solvents. The liquid olefin hydrocarbon is readily soluble in aromatic paraffinic chlorinated hydrocarbons, acetates, ketones and relatively high molecular weight alcohols. Dialkyl sulfoxides, for example, dimethyl sulfoxide, have been found particularly useful as a solvent.

As stated previously, the olefinic hydrocarbon mixture is added to the heated mixture of reduced iron and coke. The amount of olefinic material added depends upon the amount of carbon which is to be incorporated in the reduced iron material. Generally, about 1 part of olefin is used to about 4 to about 10 parts of coke. For example, a reduced iron ore material containing about 2 wt. percent carbon in the form of petroleum coke, generally will contain about 0.2 wt. percent of olefinic material. A reduced iron ore material containing about 20 wt. percent carbon as petroleum coke will contain about 5 wt. percent of olefinic material.

When the solid materials are being mixed and heated in a blender, the olefinic material can be added batchwise. On the other hand, when the solvent materials are being heated and mixed in a fluidized bed reactor, the olefinic material can be introduced into the bed through a spray nozzle.

As will be appreciated by one skilled in the art, the rate at which the olefinic material is added to a fluidized bed of reduced iron and coke, and the residence time of such material in the fluidized bed can be used to control the amount of carbon deposited on the reduced ore. In a typical process, a reduced iron bearing material, carbon and olefin are fluidized in proportions such as those previously specified generally for about 30 to 300 minutes and preferably for about 30 to 60 minutes at about 200° F. to about 600° F.

When the polymeric material is brought into contact with ore and coke in a batchwise process, the resultant mixture is blended for a period generally ranging from about 1 to about 20 minutes and preferably from about 5 to about 10 minutes.

Whether the coke is deposited on the reduced metal by a fluidization process or by a batch process, a reduced iron material containing an adherent layer of carbon is provided.

The invention and its advantages will be better understood by reference to the following illustrative examples.

In the following selected examples a reduced iron product is obtained by charging a raw natural non-specular hematite ore to the top or initial stage of a reactor containing a series of fluidized beds. The ore is progressively reduced upon descent from one bed to the next of the series by treatment within ascending reducing gas comprising CO, $H_2$, $CO_2$ and $H_2O$. The reducing gas is introduced into the reactor at temperatures ranging from about 1200° F. to about 1900° F. In the final fluidized bed, the temperature ranges from about 1500° F. to about 1800° F. A particulate reduced iron product about 95 percent metallized is withdrawn from the final stage of the reactor. The reduced iron ore contains particles ranging from about 1 to about 10,000 microns in size, with an average particle size ranging from about 40 to about 500 microns in size.

The liquid olefin hydrocarbon utilized in the following examples has the approximate chemical and physical compositions set forth below:

| | |
|---|---|
| Average carbon number | $C_{30}$–$C_{35}$ |
| Cyclodienes, wt. % | 7–10 |
| Gravity, API (ASTM D 287–55) | 10–13 |
| Viscosity, SSU 210° F. (ASTM D 88–53 ) | 210–220 |
| Flash, COC, °F. (ASTM D 92–52) | 280 |
| Iodine Number cg./g. (ASTM D 555–54) | 240–255 |
| Ash wt. % | 0.06 |
| Nonvolatile matter wt. % (ASTM D 154–53) | 95 |
| Color, Gardner (lg. Olefin in 67 mil water white xylene) | 10 |
| Acid number, Mg KOH/g | 0.1 |
| Saponification number mg KOH per gram | 3.18 |
| Surface tension, dynes/cm | 44.5 |
| Distillation at 10 min. (ASTM D 1160), °F. | |
| IBP | 182 |
| 5% | 298 |
| 10% | 326 |
| 20% | 377 |
| 30% | 425 |
| 40% | 464 |
| 50% (cracked) | 504 |

The coke employed in the following example was a ground Avon Tidewater petroleum coke which had a particle size ranging from 50 to 200 microns.

EXAMPLE 1

The following examples illustrate the importance of contacting the reduced ore and coke in the presence of an olefinic material in accordance with this invention.

PART A - WITHOUT OLEFIN

A fluidization reactor was charged with 400 lbs. of the reduced iron ore and 34 pounds of the petroleum coke. The solids were suspended in a fluidized state by introducing nitrogen into the vessel at a temperature of about 500° F., and at a velocity of 1.1 feet per second. After fluidizing the coke and reduced ore for 60 minutes, the product was withdrawn from the bed and found to contain 1.3 wt. percent coke. The remainder of the coke charged, 6.8 percent, was lost in the effluent gas stream. Additionally, the product was a nonuniform dusty mixture of reduced iron and coke. Part B - With Olefin The procedure of part A was repeated except that the olefinic hydrocarbon material described in detail above was injected into the fluidized bed to deliver 0.16 wt. percent of olefin based on the total mixture of reduced ore, coke and olefin. The olefinic hydrocarbon material was introduced in the fluidized bed through a spray nozzle over a 60 minute period after the ore and coke reached 500° F. When the addition of olefin was complete, the product was withdrawn and found to be a dust-free coke coated iron material containing 8.17 wt. percent coke. The amount of coke lost in the effluent gas stream did not exceed 0.06 wt. percent of the total coke charged.

As can be seen from this example a dust-free, carbon coated, reduced, iron bearing material can be obtained when the olefinic hydrocarbon is employed according to this invention.

EXAMPLE 2

This example illustrates a batch method of practicing the invention. A jacketed ribbon blender was charged with 100 lbs. of the reduced iron ore and 2 lbs. of the ground coke both of which have been described in greater detail above. This mixture was heated to 235° F. by adding steam to the blender jacket. After the solids reached 235° F., 0.4 wt. percent of the olefinic material based on the total mixture was added and blending was continued for 15 minutes. After blending material was completed the product was found to be an intimate mixture of coke coated reduced iron that could be handled without segregation of the coke and iron. Moreover, the product was substantially dust free. The product contained 2.3 wt. percent carbon.

What is claimed is:

1. A process for depositing carbon on a metal comprising contacting the metal and carbon at elevated temperatures in the range of from about 200° F. to about 600° F. in the presence of a liquid olefin hydrocarbon of average carbon number ranging from about $C_{20}$ to about $C_{60}$ for a time sufficient to cause the carbon to deposit on the metal and recovering a substantially dust-free carbon coated metal product.

2. A process according to claim 1 wherein the metal is an iron bearing material from a direct reduction process and the carbon is petroleum coke.

3. A process according to claim 2 wherein the reduced iron bearing material and coke are contacted in a ratio sufficient to provide a provide a product containing from about 2 to about 20 percent carbon.

4. A process according to claim 2 wherein the iron bearing material is a finely divided particulate solid resulting from a fluidized iron ore reduction process.

5. A process according to claim 1 wherein the metal, carbon and olefin are contacted in a ratio sufficient to provide a mixture containing from about 0.1 wt. percent to about 5 wt. percent of said liquid olefin.

6. A process according to claim 1 wherein the metal and carbon are mixed in a fluidized bed by a nonoxidizing ascending gas stream and said liquid olefin hydrocarbon is introduced into the bed.

7. The process of claim 1 wherein the liquid olefin hydrocarbon is a mixture of olefins and diolefins including cyclopolyenes and cyclodienes and the average number range is from about $C_{30}$ to about $C_{45}$.

8. The process of claim 1 wherein the viscosity of the olefinic liquid hydrocarbon is maintained between about 100 SSU and 250 SSU.

9. The process according to claim 1 wherein the metal is reduced iron ore ranging from about 80 percent to about 95 percent metallization.

10. The process according to claim 1 wherein the carbon has particle size ranging from about 10 to 200 microns.

11. The process of claim 1 wherein said carbon is carbon black, petroleum coke, furnace black of channel black.